United States Patent [19]

Taniguchi et al.

[11] Patent Number: 5,056,153
[45] Date of Patent: Oct. 8, 1991

[54] MOBILE ELECTRIC ACCESSORY APPARATUS

[75] Inventors: Tatsuaki Taniguchi, Hiroshima; Takashi Hirata, Higashihiroshima, both of Japan

[73] Assignee: Mazda Motor Corporation, Hiroshima, Japan

[21] Appl. No.: 225,397

[22] Filed: Jul. 28, 1988

[30] Foreign Application Priority Data

Jul. 29, 1987 [JP] Japan ................. 62-187792
Jul. 29, 1987 [JP] Japan ................. 62-187794
Jul. 29, 1987 [JP] Japan ................. 62-187796

[51] Int. Cl.$^5$ .................................. H04B 17/02
[52] U.S. Cl. ........................... 455/89; 455/133; 455/297; 455/343; 455/277
[58] Field of Search ................. 455/277–279, 455/342, 133–135, 297, 343, 345, 74, 89, 90, 127; 343/711–713

[56] References Cited

U.S. PATENT DOCUMENTS

| | | | |
|---|---|---|---|
| 4,141,016 | 2/1979 | Nelson | 455/74 |
| 4,157,547 | 6/1979 | Freimark et al. | 455/74 |
| 4,631,496 | 12/1986 | Borras et al. | 455/343 |
| 4,631,737 | 12/1986 | Davis et al. | 455/343 |
| 4,742,567 | 5/1988 | Ohe et al. | 455/277 |

Primary Examiner—Curtis Kuntz

[57] ABSTRACT

A mobile electric accessory apparatus for mounting on a vehicle equipped with a wireless transceiver unit such as a mobile radiotelephone and a separate wireless receiver unit such as a television receiver is adapted to limit operation of the wireless receiver unit, as by cutting off power thereto or inhibiting reception of a signal from the corresponding receiving antenna, when the wireless transceiver unit is being used, thereby preventing interference in the reception of the wireless receiver unit. If a receiving antenna nearest the transceiver antenna of the transceiver unit, when the latter is in use, is excluded from the antennas in a diversity reception system, good reception can be obtained. By disposing antenna for the transceiver unit and the antenna for the receiver unit on a single windshield glass adjacent mutually opposing edges thereof, the receiver unit will not have its reception disturbed by electric waves from the transceiver unit.

14 Claims, 8 Drawing Sheets

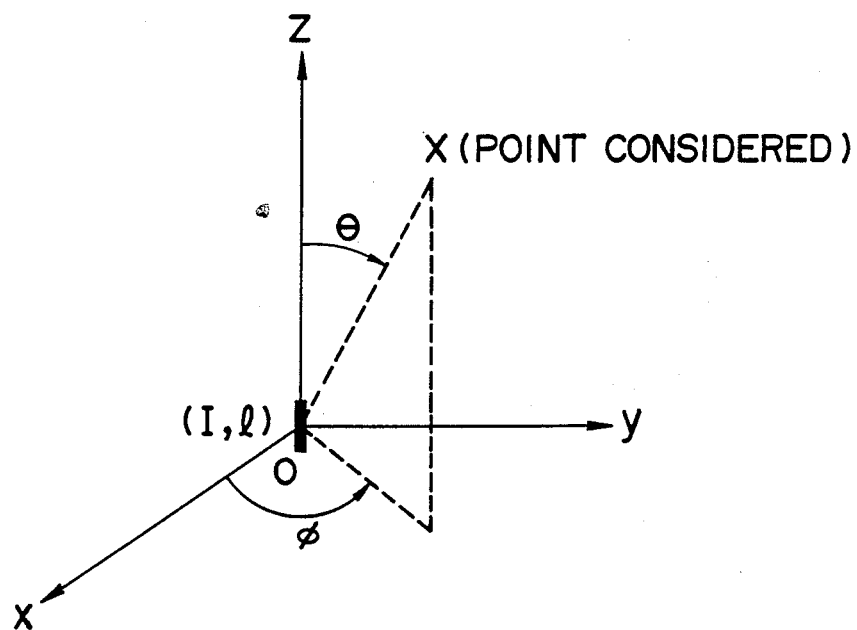
CURRENT ELEMENT AND
COORDINATE SYSTEM
F I G. 7
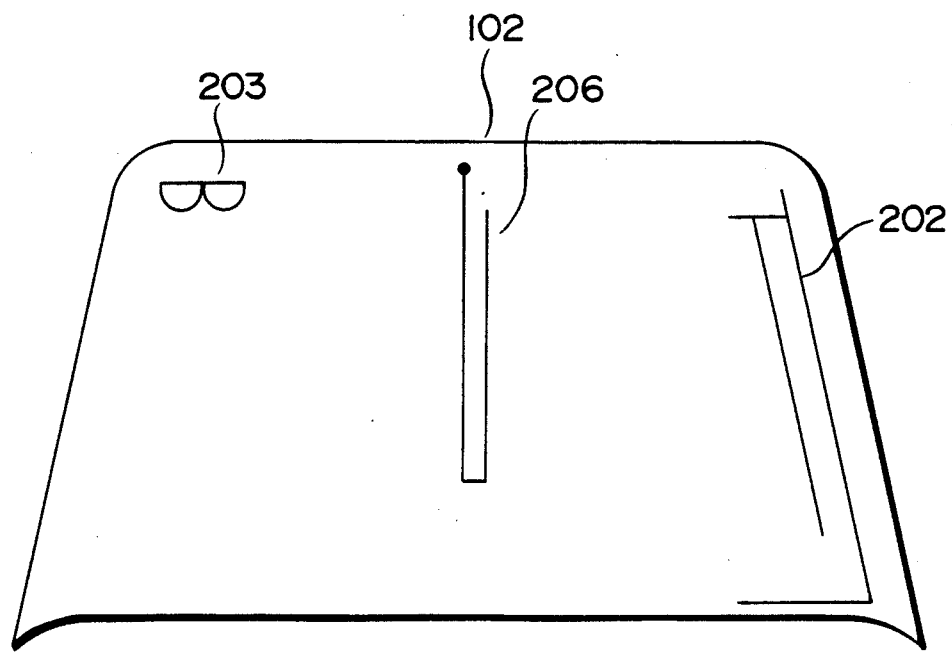
F I G. 9

MOBILE ELECTRIC ACCESSORY APPARATUS

BACKGROUND OF THE INVENTION

This invention relates to mobile electric accessory apparatus for an automotive vehicle equipped with both a transceiver unit for wireless communication and another wireless receiver unit.

Recent advances in radio communications and semiconductor technology have been accompanied by an improvement in the performance of radio communications equipment. Progress has also been made in reducing the size and enhancing the capabilities of radio communications equipment. As a result, there has also been progress in the area of size reduction and capability enhancement of, e.g., television broadcast receivers in addition to AM/FM transceivers, and automobiles can now be equipped with both types of equipment. In order to assure that these apparatus will enjoy good reception at all times, a so-called "diversity system" is adopted in which each is provided with a plurality of antennas and the antenna giving the best reception is selected.

For example, Japanese Patent Application Laid-Open (KOKAI) No. 61-121601 discloses means for improving the reception of a mobile television unit, namely a television unit installed in an automobile. In view of the fact that locations at which an antenna can be installed in a vehicle are limited, this disclosure proposes adopting diversity reception by making joint use of an antenna for receiving FM broadcasts near the frequency bands of the broadcast waves, and an antenna for receiving low-frequency band television broadcasts.

However, this prior art disclosure does not take into account the antenna for a radiotelephone that can now be installed in an automobile thanks to recent advances in technology. A mobile telephone unit emits radio waves of considerable strength, and there are cases where the frequency of the radio waves transmitted and received by the mobile telephone are adjacent the television reception frequency (particularly in the vicinity of channel 62). Consequently, the radio waves emitted by the telephone apparatus can be received by the antenna for the television receiver. If the electric waves of the television broadcast are received in a weak condition, the radio waves from the telephone may interfere with television reception, thus resulting in a poor television picture.

Another problem that results from use of the mobile telephone is that a large amount of noise resembling a buzzing sound emanates from the television speaker at the same time, thus making it difficult to hear what is being said on the telephone.

SUMMARY OF THE INVENTION

Accordingly, an object of the present invention is to provide a mobile electric accessory apparatus which, when a transceiver unit such as a radiotelephone is used, makes it possible to minimize the influence on another wireless receiver unit such as a television receiver.

According to the present invention, the foregoing object is attained by providing a mobile electric accessory apparatus which, during use of a wireless transceiver unit such as a mobile telephone unit installed in an automobile, controls the operation of another wireless receiver unit such as a television receiver to prevent interference.

In a preferred embodiment of the invention, a receiving antenna adjacent a transceiving antenna for a wireless transceiver unit that is in use is excluded from other receiving antennas in a diversity reception system, thereby assuring good reception.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 is a view illustrating a current element and coordinate system for calculating electric field strength;

FIG. 9 is a view showing an example of an antenna wire arrangement for a front windshield glass in another embodiment of the invention.

DESCRIPTION OF THE PREFERRED EMBODIMENTS

Preferred embodiments of the present invention will now be described in detail with reference to the drawings.

First Embodiment

An embodiment will now be described in which an automobile is equipped with both a mobile telephone unit serving as a wireless transceiver unit and a mobile television receiver serving as a wireless receiver unit.

Figure 1:
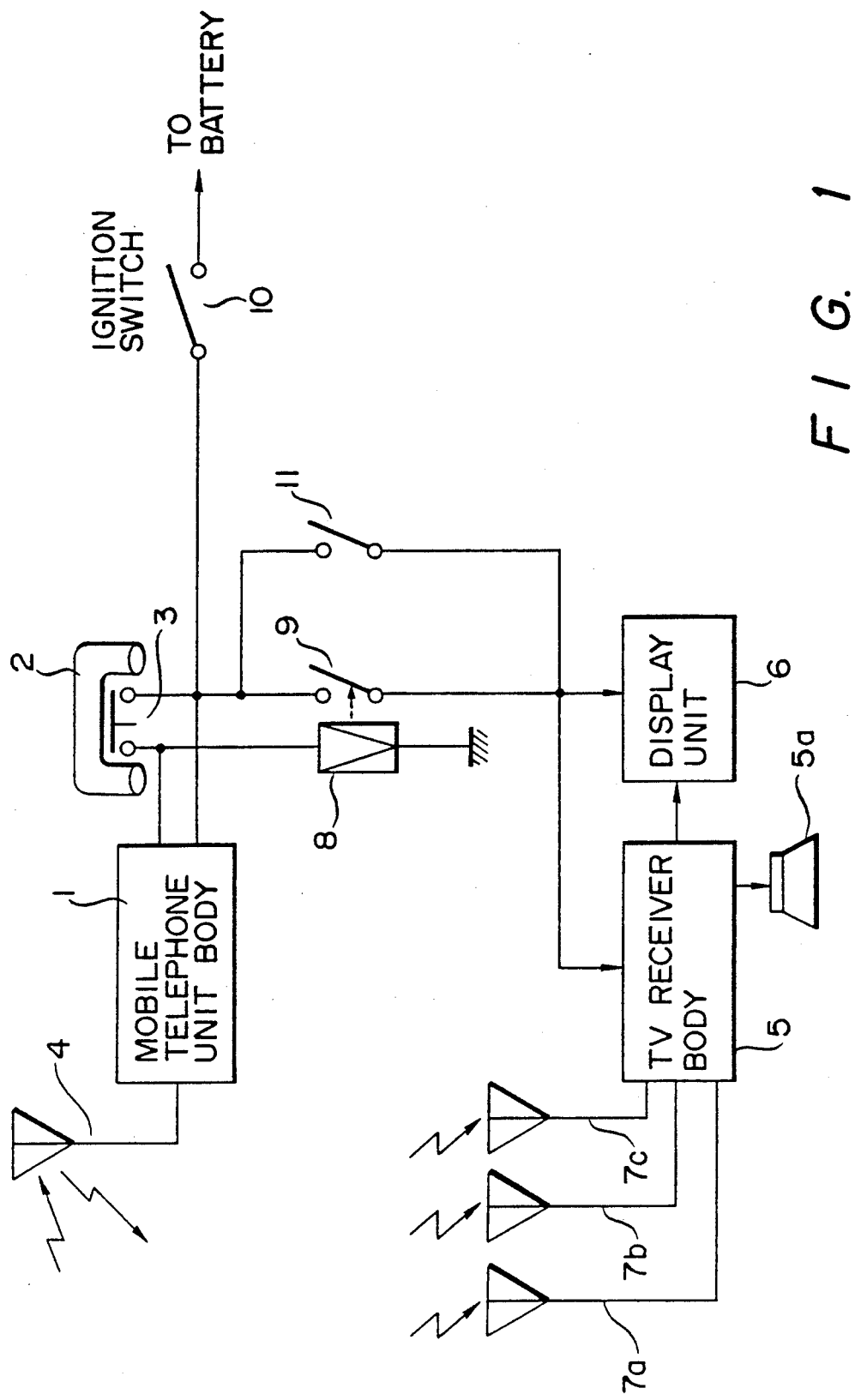
FIG. 1 is a block diagram illustrating a first embodiment of a mobile electric accessory apparatus according to the present invention.

FIG. 1 is a block diagram illustrating the mobile electric accessory apparatus embodying the invention. The system shown in FIG. 1 includes a mobile telephone unit body 1 having a handset 2, a hook switch 3 for detecting that the handset 2 has been lifted, the hook switch 3 attaining an "on" state when the handset 2 is taken off the hook and an "off" state when the handset 2 is hung up, and a transceiving antenna 4.

In the present embodiment, the components mentioned above construct a mobile telephone unit.

The system of FIG. 1 includes another wireless receiver unit, e.g., a television receiver, installed in the automobile. The television receiver includes a television receiver body 5, a display unit 6 comprising a CRT or liquid crystal display device, and television broadcast receiving antennas 7a, 7b and 7c from among which a selection is made giving the best reception. The television receiver body 5 is provided with a speaker 5a.

In accordance with this embodiment, means are provided for controlling the television receiver during operation of the mobile telephone (i.e. during communication using the telephone) in order to diminish annoyance caused by an adverse effect upon the television receiver and improve the communication environment.

When the reception environment is unsatisfactory, as in cases where the television broadcast waves are received in a weak condition, the television is adversely influenced by the emanation of strong radio waves from the mobile telephone unit, particularly if the communication frequency of the mobile telephone unit and the frequency assigned to the television broadcast are close together. (In the Hiroshima district of Japan, for example, the communication frequency for telephone communication is 900 MHz, and the frequency of a UHF television broadcast is 870 MHz.) As a result, interference is generated in both the picture and sound produced by the television unit.

In order to deal with this situation appropriately, a relay 8 having a contact 9 is provided, the relay 8 being energized when the hook switch 3 is turned on. When the handset 2 is taken off the hook, thereby turning on the hook switch 3, the relay contact 9 is opened. This stops power from being supplied to the television receiver body 5 and display unit 6.

In accordance with this arrangement, when the user takes the handset 2 of the mobile telephone unit off the hook in order to make a call or respond to a call, the hook switch 3 is turned on, whereupon the supply of power to the other wireless receiver unit (the television receiver in this embodiment) is cut off. Consequently, if the electric waves received by the other wireless receiver unit, namely the television receiver, are weak, annoyance caused by interference due to use of the mobile telephone unit is prevented.

Further, since output of an audio signal from the wireless receiver unit can be prevented while the mobile telephone is being used, the communication environment is greatly improved Moreover, by cutting off the supply of power to the wireless receiver unit, it is possible to reduce the consumption of storage battery power. This is important since a device such as a mobile television unit can consume a great deal of power.

In the description given above, power to the wireless receiver unit is cut off unconditionally regardless of whether the wireless receiver unit is on or off. However, control can be performed in such a manner that the relay 8 is energized only if power is being introduced to the wireless receiver unit. In such case, it would suffice to provide a gate in series with the hook switch 3 for the purpose of taking the logical product (AND) between the signal from the hook switch and a signal indicative of operation of the wireless transmitter unit. Such an arrangement makes it possible to prevent contact wear caused by unnecessary actuation of the relay.

Since a case is conceivable in which the user may wish to continue receiving a television broadcast irrespective of the state of reception of the television receiver, the apparatus of the present embodiment is provided with a mechanism for cancelling the control operation, which is performed by the relay 8, wherein the supply of current is cut off from the television receiver. This mechanism is a manual cancellation switch 11 provided in parallel with the contact 9 of relay 8. When the manual cancellation switch 11 is closed, the television receiver is supplied with power irrespective of the state of relay 8.

By exercising control in the manner described above, the television picture and sound are prevented from being disturbed by use of the mobile telephone unit. Besides eliminating the annoyance of a disturbed television picture and sound, an excellent communication environment can be maintained.

In the invention as described above, supply of power to both the television receiver body 5 and display unit 6 is halted when the mobile telephone is used. However, it is possible to exercise control in such a manner that the cut-off of power applies only to the television receiver 5 and not the display unit 6, which can then be made to present a display other than a television picture. For example, it can be arranged for the display unit 6 to display instructions for operating the mobile telephone.

Figure 2:
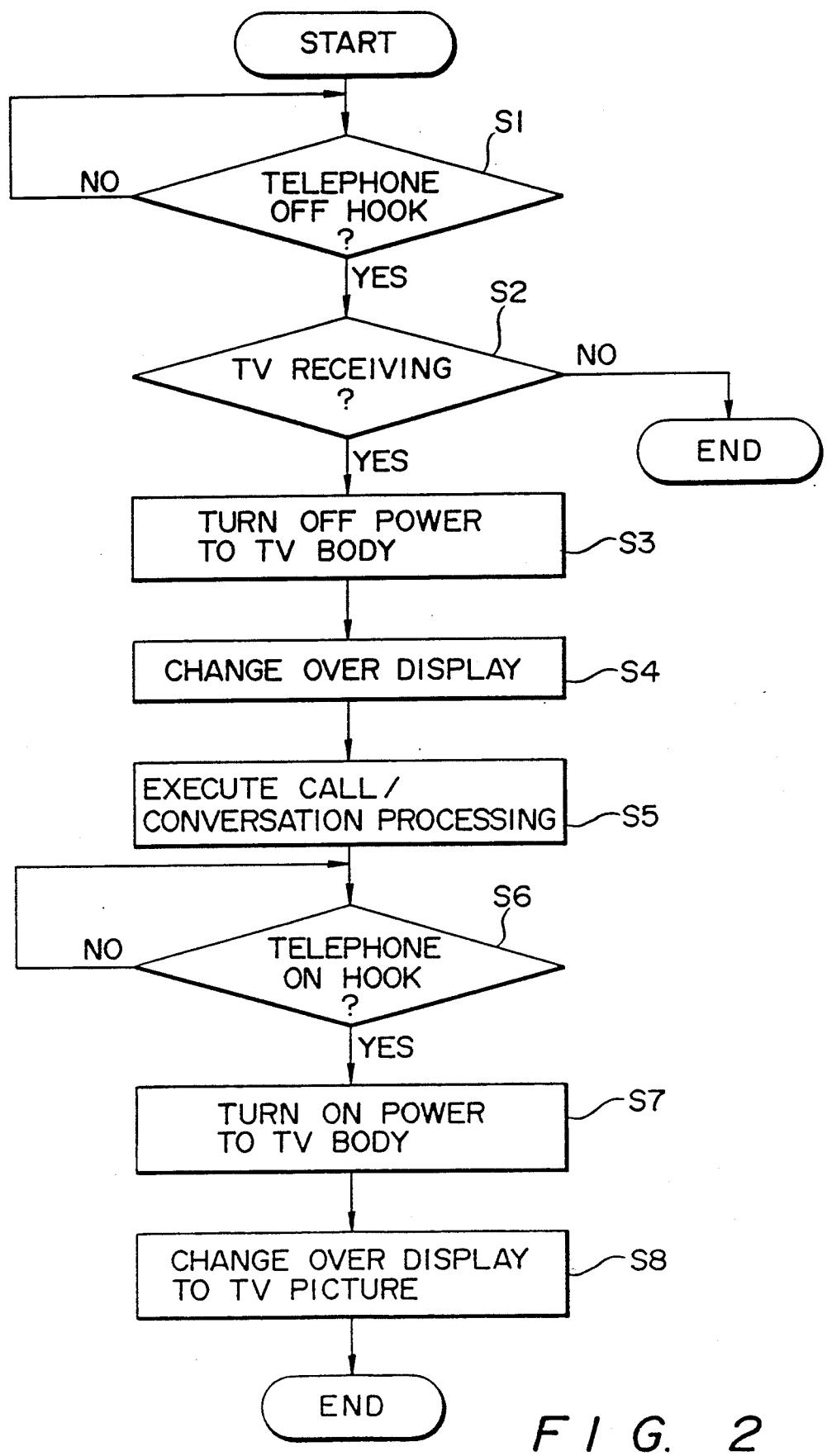
FIG. 2 is a television receiver control flowchart according to the present embodiment.

A case in which control is performed in this manner will now be described with reference to the flowchart of FIG. 2.

When the handset 2 of the telephone unit is taken off the hook (step S1), it is determined at a step S2 whether a television broadcast is being received. For example, if power is being introduced to the television receiver body 5, this indicates that television reception is in effect. If a television broadcast is not being received, control is terminated. If television reception is in effect, the program proceeds to a step S3. Here the supply of power to the television receiver body 5 is cut off. This is followed by a step S4, at which the display presented on the display unit 6 is changed over so that the display unit 6 may present a display of data previously stored in an internal memory. An example of such display data is the method of operating the telephone, a telephone number list, etc.

Next, the telephone is operated at a step S5 to call and start communication with a desired party. This is followed by a step S6, at which monitoring is performed to determine if the handset 2 has been hung up at the end of a conversation.

When the telephone conversation ends and the handset 2 is hung up, power is supplied to the television receiver body 5 at a step S7. The television channel, volume and the like are restored to what they were immediately before the power supply was cut off at the step S3. Lastly, the display presented by the display unit 3 is changed over to the television picture from the television receiver body 5 at a step S8, after which control is terminated.

By performing control in this manner, the display screen of the display unit 6 can be utilized effectively, in comparison with the case where both the television receiver and the display unit are turned off.

Second Embodiment

In the foregoing description, a mobile telephone unit is installed in an automobile. However, portable telephones have also appeared on the market as a result of recent technological progress. If the user is within a telephone service area, such a portable telephone can be carried about freely and can be used anywhere and at any time for wireless communication. Naturally, a portable telephone of this type can be carried into an automobile and used while the automobile is traveling.

As in the case of the mobile telephone unit mentioned above, the influence that a portable telephone has upon other wireless receiver units such as a television receiver, cannot be ignored. Therefore, it is desired that these other wireless receiver units be controlled in a manner similar to that of the first embodiment.

Figure 3:
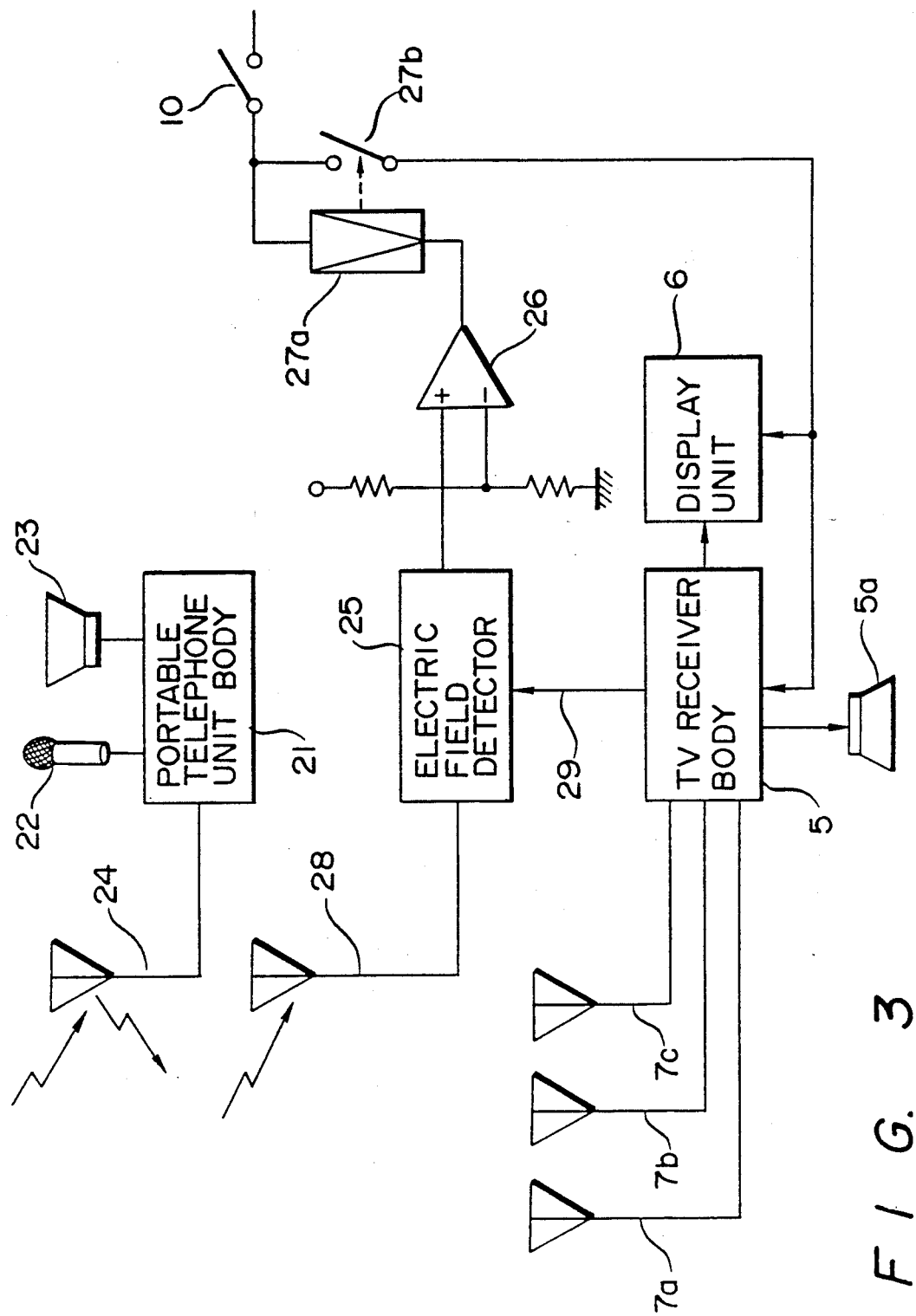
FIG. 3 is a block diagram illustrating a second embodiment of a mobile electric accessory apparatus according to the present invention.

An embodiment capable of dealing with a portable telephone is illustrated in FIG. 3, in which portions similar to those shown in FIG. 1 are designated by like reference characters and need not be described again.

In FIG. 3, numeral 21 denotes a portable telephone body, 22 a microphone and 23 a speaker. The system further includes a transceiving antenna 24 for the portable telephone unit, an electric field detector 25 for detecting the strength of an electric field at a field strength detecting antenna 28, and for outputting a signal the level whereof is proportional to the detected field strength, and a comparator 26 for comparing the field strength signal from the field strength detector 25 with a fixed level, and for energizing a coil 27a of a relay 27 when the field strength signal has a level higher than the fixed level. The relay 27 has a contact 27b for introducing power to and removing power from the television receiver body 5 and display unit 6. When the relay 27 is energized, the contact is opened to cut off the supply of power. Numeral 29 denotes a signal indicating that the television is on. When this signal is produced, the field detector 25 is actuated to produce an output signal.

If an ignition switch 10 is closed in this arrangement, the relay 27 initially is not energized, so that the contact 27b is closed. Consequently, power from a battery (not shown) is supplied to the television receiver body 5 and display unit 6; when a power supply switch on the television receiver body 5 is closed, the television will receive a broadcast signal. The antenna giving the best reception is selected from among the set of antennas 7a through 7c when the television broadcast is received. At such time the signal 29 indicating that the television is on is outputted to actuate the field detector 25, which responds by producing an output signal whose level corresponds to the detected electric field strength. When the portable telephone unit 21 is not in operation, however, the electric field strength will not be especially great and the output of the comparator 26 will be nil.

When call processing or response processing for answering a call is executed by the portable telephone unit in order to carry out a conversation, the transceiving antenna 24 for the portable telephone unit emanates high-output radio waves. These waves are received by the field strength detecting antenna 28, as a result of which the field detector 25 produces a high-level output signal applied to the comparator 26. The threshold level of the comparator 26 is set so that the comparator output will be nil when no radio waves are produced by the portable telephone unit. In other words, the comparator 26 will produce an output only when electric waves emanate from the portable telephone unit. When this is the case and the comparator 26 produces an output signal, the relay 27 is energized to open the contact 27b. As a result, power is automatically cut off from the television receiver body 5 and display unit 6. This eliminates any annoyance caused by a distorted television picture when the radio waves from the portable telephone are picked up by the television receiver and when a noise component is outputted by the telephone. Since the audio signal from the television receiver is also terminated, there is no adverse effect upon a telephone conversation. This enables a telephone conversation to proceed without hindrance.

It should be noted that the field detector 25 is equipped with an output signal peak-hold circuit (not shown) so that the output signal level will not drop if there is a long break in a telephone conversation (i.e. a long interval in voice transmissions from the portable telephone unit). Thus, control is such that the relay 27 will not be deenergized accidentally to supply power to the television receiver body 5 while a telephone conversation is in progress.

In the description given above, an example is described in which a television receiver is the other wireless receiver. However, the television receiver was taken as an example only because it is particularly susceptible to interference from the telephone unit. The invention can be applied to a radio receiver as well, in which case a suitable communication environment can be similarly achieved by exercising control so as to turn off the radio receiver when the telephone is in use.

Likewise, the invention can be applied to exercise control so as to turn off mobile audio equipment such as a car stereo.

In these cases, it is of course possible to adopt control in which volume is reduced to a level that will not interfere with a telephone conversation, rather than cutting off the supply of power to the particular device.

As described above, when a telephone unit installed in an automobile is used to place a call or respond to a call, another wireless receiver unit such as a television receiver is placed under control. This makes it possible to realize an ideal communication environment and to save energy by reducing battery consumption while the wireless receiver unit is cut off.

Third Embodiment

The foregoing description relates to a case where a television receiver is stopped from receiving a broadcast signal unconditionally while the telephone is in use. However, the invention is not limited to the foregoing embodiment. It is possible to perform control in such a manner that the television receiver is allowed to continue receiving a broadcast signal if good reception can be maintained. In such a case, it will suffice to provide a plurality of receiving antennas and adopt a diversity function for selecting the antenna that will give the best reception.

A third embodiment of the present invention will now be described in detail with reference to FIGS. 4 through 8.

In the description that follows, the detailed construction of a television receiver and a mobile telephone will also be discussed.

Figure 4:
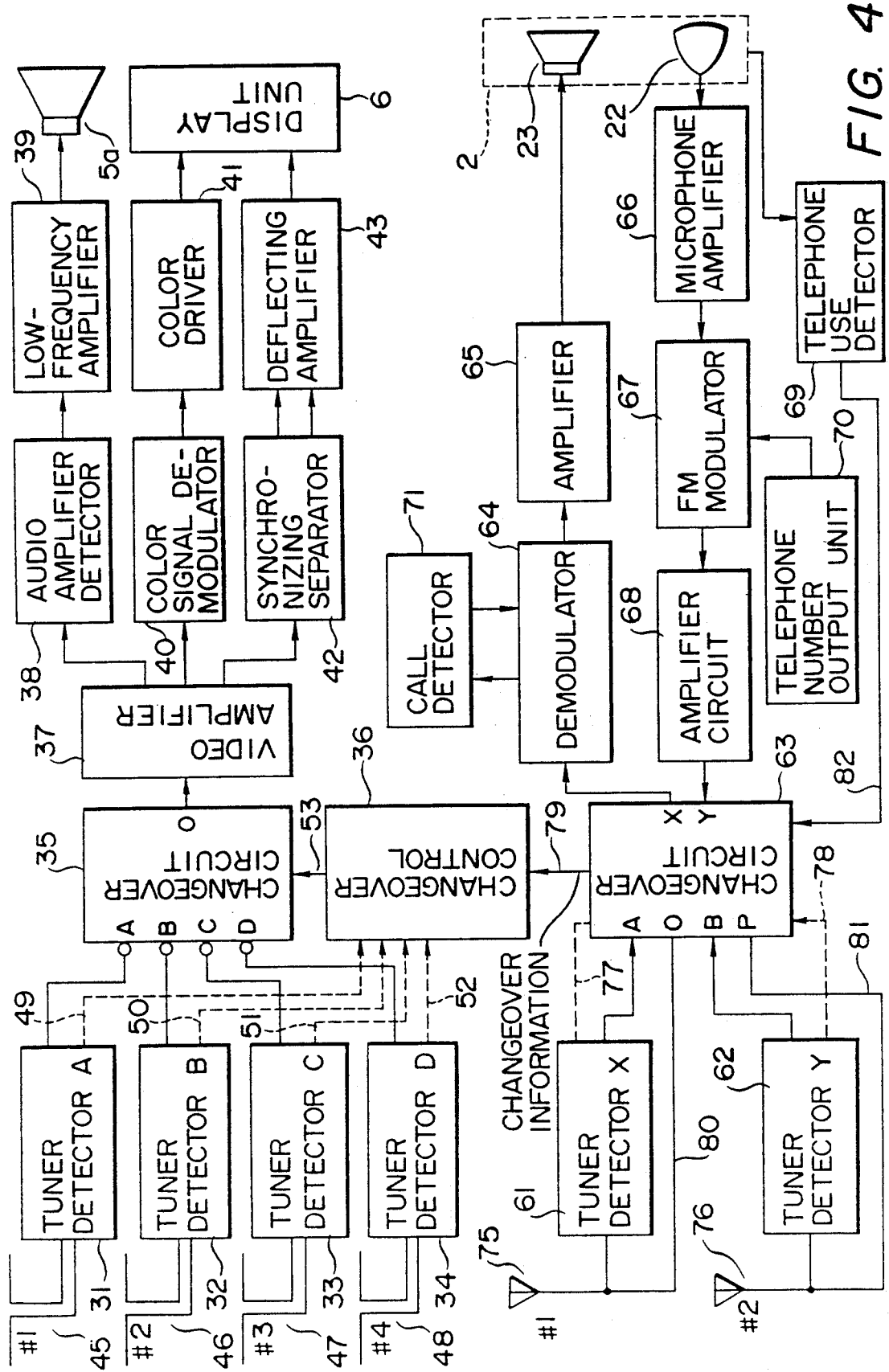
FIG. 4 is a block diagram illustrating a third embodiment of a mobile electric accessory apparatus according to the present invention.

FIG. 4 is a block diagram illustrating a third embodiment of the present invention. Numerals 31-34 denote tuner detectors A-D respectively connected to #1-#4 antennas 45-48. These tuner detectors each comprise a well-known intermediate frequency amplifier circuit and a video detector circuit in addition to a tuner section. Reception state signals 49-52 indicative of the received field strength of the channels selected by the tuner detectors A-D (31-34) are delivered to a changeover controller 36. The latter controls a changeover circuit 35, in accordance with conditions set forth below, to select any one of the tuner detectors A-D (31-34) and provide a video amplifier 37 with the reception signal from the selected video detector. The video amplifier 37 amplifies the detected video signal applied thereto and outputs an audio signal to an audio amplifier/detector 38. The latter amplifies the intermediate frequency of the input signal and performs FM detection. The detected signal is outputted to a low-frequency amplifier 39, where the signal is amplified to the output level of the speaker 5a to produce an audio output.

The video amplifier 37 outputs a luminance signal and a carrier color signal to a color signal demodulator 40.

The latter subjects a color burst signal to phase detection, performs color demodulation in accordance with the band amplified carrier color signal, and outputs the result to a color driver 41 together with the luminance signal. The color driver 41 amplifies the R, G and B signals and outputs the results to the display unit 6, which comprises a CRT or the like. At the same time, the video amplifier 37 outputs a synchronizing signal to a synchronizing separator circuit 42. The latter separates the input into a vertical synchronizing signal and a horizontal synchronizing signal, which are amplified and deflected by a deflecting amplifier 43 and then delivered to the display unit 6. In accordance with these signals, the latter displays a picture signal on the display screen.

These components are those of an ordinary color television receiver and a detailed description of the operation thereof is omitted.

An automobile having the above-described color television receiver is also equipped with a mobile telephone unit, the construction whereof will now be described.

The telephone unit is started in response to use of the telephone detected by a telephone use detector 69. In this embodiment, a decision is rendered to the effect that the telephone unit is in use when the detector 69 detects that the handset 2, which has a microphone 22 and a speaker 23, is taken off the hook. However, detection of use of the telephone is not so limited, for an arrangement can be adopted in which use of the telephone is detected by detecting emanation of radio waves from an antenna 75 or 76 as a result of telephone call control. Upon detecting use of the telephone, the detector 69 outputs a telephone-use detection signal 82 to a changeover circuit 63.

When a call is placed to a party from the telephone, the user takes the handset 2 off the hook and inputs a telephone number using push-buttons (not shown) on a telephone number output unit 70. The latter delivers a signal indicative of the inputted telephone signal to the changeover circuit 63 via an FM modulator 67 and an amplifier circuit 68. The changeover circuit 63 responds by delivering an output from an antenna #1 (75) or an antenna #2 (76). A central telephone exchange receives the outputted signal and calls the desired party, thereby enabling communication.

The message signal from the called party (or the calling party) is transmitted from the exchange as radio waves and is received by the receiving antennas 75 and 76. The received signals are selectively amplified and detected by the tuner detectors X(61) and Y (62), each of which comprises sections for high-frequency amplification, frequency conversion, intermediate frequency amplification and FM detection, and the resulting signals are delivered to the changeover circuit 63. The tuner detectors X(61) and Y (62) simultaneously output reception state signals 77, 78 indicative of electric field strength. The changeover circuit 63 receives the reception state signals from these tuner detectors and investigates which tuner detector provides the best reception. The tuner detector giving the best reception is selected and this signal is delivered to a demodulator 64. The demodulator 64 demodulates the selected detection signal when required, and the resulting signal is amplified by an amplifier 65 to produce an audio output from the speaker 23.

A voice signal inputted from the microphone 22 of the telephone unit is amplified by a microphone amplifier 66, the amplified signal is modulated by an FM modulator 67, and the modulated signal is amplified by an amplifier circuit 68 and then delivered to the changeover circuit 63. The latter transmits the amplified signal from the selected antenna.

If a call is received when the telephone unit is not being used, the call signal is received by the tune detectors X and Y (61 and 62) and delivered to the demodulator 64. This is detected by a call detector 71, which responds by outputting a call signal via the amplifier 65. The call signal can be outputted from the speaker 23 or from another speaker that is not shown. A response to the call is acknowledged by taking the handset 2 off the hook.

Since the foregoing processing in the telephone unit for placing and receiving a call is well-known, a detailed description thereof is omitted.

In the present embodiment, diversity control of the television antennas is specially contrived to prevent the radio waves generated by the mobile telephone unit from interfering with reception on the television receiver side.

Specifically, when the detector 69 detects that the telephone is in use, a signal 82 indicative of the fact is delivered to the changeover circuit 63. The latter responds to this signal by selecting the mobile telephone antenna that gives the best reception and sending antenna changeover information 79, which is indicative of the selected antenna, to the changeover controller 36 on the television receiver side. A television broadcast receiving antenna in the vicinity of (e.g. the antenna closest to) the mobile telephone unit antenna indicated by the changeover information 79 is excluded from the diversity system by the changeover controller 36, so that this receiving antenna will not be selected.

Figure 5:
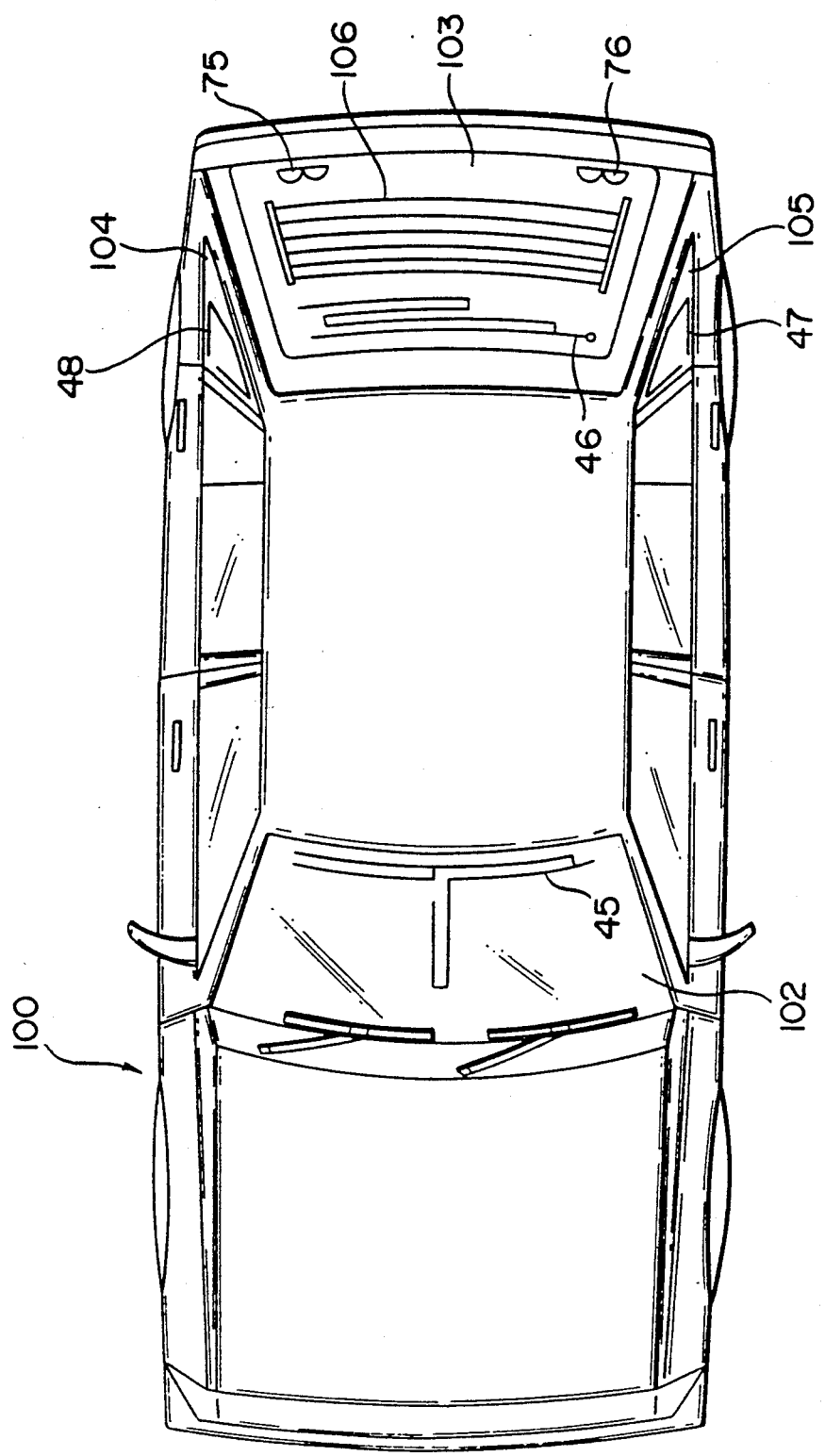
FIG. 5 is a view showing an example of an antenna wire arrangement in a diversity system for a four-door sedan automobile in a third embodiment of the invention.

In the present embodiment, the television broadcast receiving antennas 45–48 and the mobile telephone antennas 75, 76 are arranged as shown in FIG. 5. Though this description relates to a four-door sedan 100 as an example of an automobile, the vehicle can be a three-door automobile or any other type.

In FIG. 5, the mobile television receiving antenna #1 (45), which has a comparatively large overall length, is disposed near the upper edge portion of a front windshield glass 102. The mobile television receiving antenna #2 (46) is similarly disposed near the upper edge portion of a rear window glass 103. The mobile telephone transceiving antennas #1 (75) and #2 (76) are arranged near the lower edge portion of the rear window glass 103 on the left and right sides. Also disposed on the inner side of the rear window glass 103 are a plurality of heater wires 106 for defogging purposes. The television antenna #3 (47) is installed in a quarter window glass 105 on the left rear side, and the television antenna #4 (48) is installed in a quarter window glass 104 on the right rear side.

Control for receiving antenna selection in the embodiment having the foregoing construction will now be described with reference to the flowchart of FIG. 6.

First, monitoring is performed at a step S11 to determine whether the telephone handset has been taken off the hook. If the answer here is NO, then the next step executed is a step S17, at which the antenna wires of all the antennas #1 (45)–#4 (48) are included in the diversity system and the antenna wire giving the best reception is selected from among these antenna wires.

When the handset 2 is taken off the hook and this fact is detected by the detector 69, the telephone-use detection signal 82 is outputted. When this occurs, the program proceeds from the step S11 to a step S12, at which it is determined whether the television receiver is receiving a broadcast, just as in step S2 of FIG. 2. If the television receiver is not receiving a broadcast, no particular control is necessary and the program proceeds to the step S17.

If a broadcast is being received, the program proceeds to a step S13, at which the changeover controller 36 receives the changeover information 79 from the changeover circuit 63 of the telephone unit and it determined whether the telephone transceiving antenna wire #1 (75) or #2 (76) has been selected.

If the antenna wire #1 (75) has been selected, the program proceeds to a step S14, at which the television antenna #4 (48) closest to the antenna wire #1 is excluded from the diversity system. Control is then exercised so as to select the antenna wire for best television reception from among the remaining antenna wires #1 (45)-#3 (47). This is followed by a step S16.

If the mobile telephone transceiving antenna wire #2 (76) has been selected, on the other hand, the program proceeds to a step S15, at which the television antenna #3 (47) closest to the antenna wire #2 is excluded from the diversity system. Control is then exercised so as to select the antenna wire for best television reception from among the remaining antenna wires #1 (45), #2 (46) and #4 (48). This is followed by step S16.

In order to exclude selection of a television antenna wire when the mobile telephone unit is in use, it will suffice to cancel and inhibit an input of the reception state information (the electric field strength signal) from the tuner detector of the television antenna to be excluded when information arrives indicating that a mobile telephone antenna is being used. Thus, the cancellation of the reception state from the particular tuner detector is construed as indicating that reception will be poor, and the corresponding antenna is not selected.

An example of another control method is to turn off the power supply of the tuner detector connected to the antenna that is to be excluded from the diversity system. By adopting this method of control, the reception state information from the particular tuner detector is construed as being indicative of poor reception and the corresponding antenna is excluded from the diversity system.

In accordance with this embodiment, television reception is unimpaired even if the television receiving antenna wire excluded from the diversity system is only that nearest the mobile telephone antenna wire in use. For this reason, only the nearest television antenna wire is excluded. However, if there are other television antenna wires which may lead to impaired television reception, as in a case where a different antenna wire arrangement is adopted, control can be exercised so as to exclude these television antenna wires from the diversity system.

Figure 6:
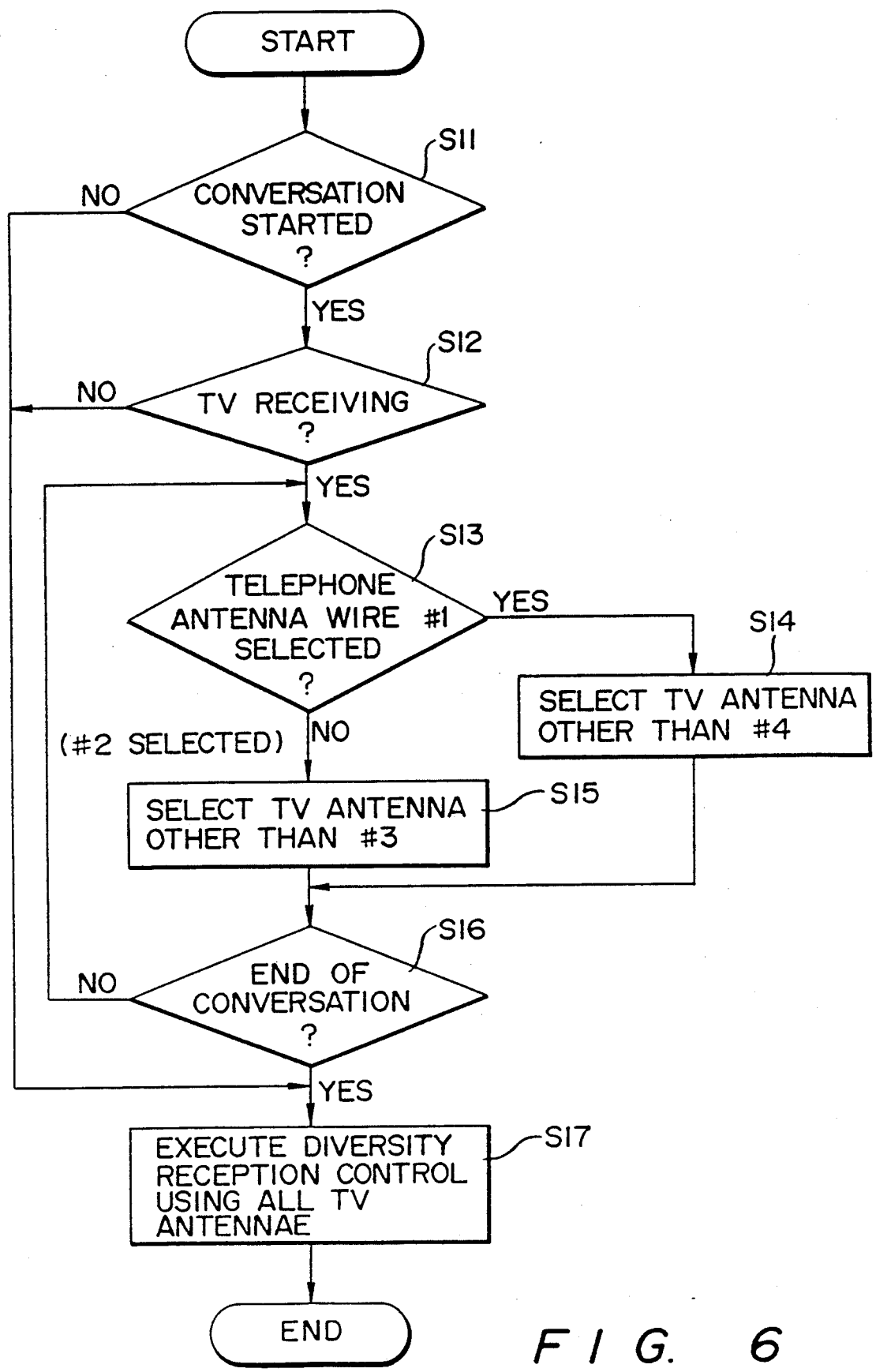
FIG. 6 is a control flowchart primarily illustrating diversity control in the third embodiment.

The step S16 in the flowchart of FIG. 6 is for determining whether the telephone conversation has ended, namely whether the handset 2 has been hung up. If the conversation is not over and the handset 2 has not been hung up, the program returns to the step S13 and execution of diversity control is repeated.

When the telephone conversation ends, the program proceeds from the step S16 to the step S17.

By thus excluding from the diversity system the television antenna nearest the mobile telephone antenna that is in use, most of the interference can be removed from the television reception. The reason for this is that a change in electric field intensity between a source of radio waves and a receiving antenna is inversely proportional to the distance between the two.

Figure 8:
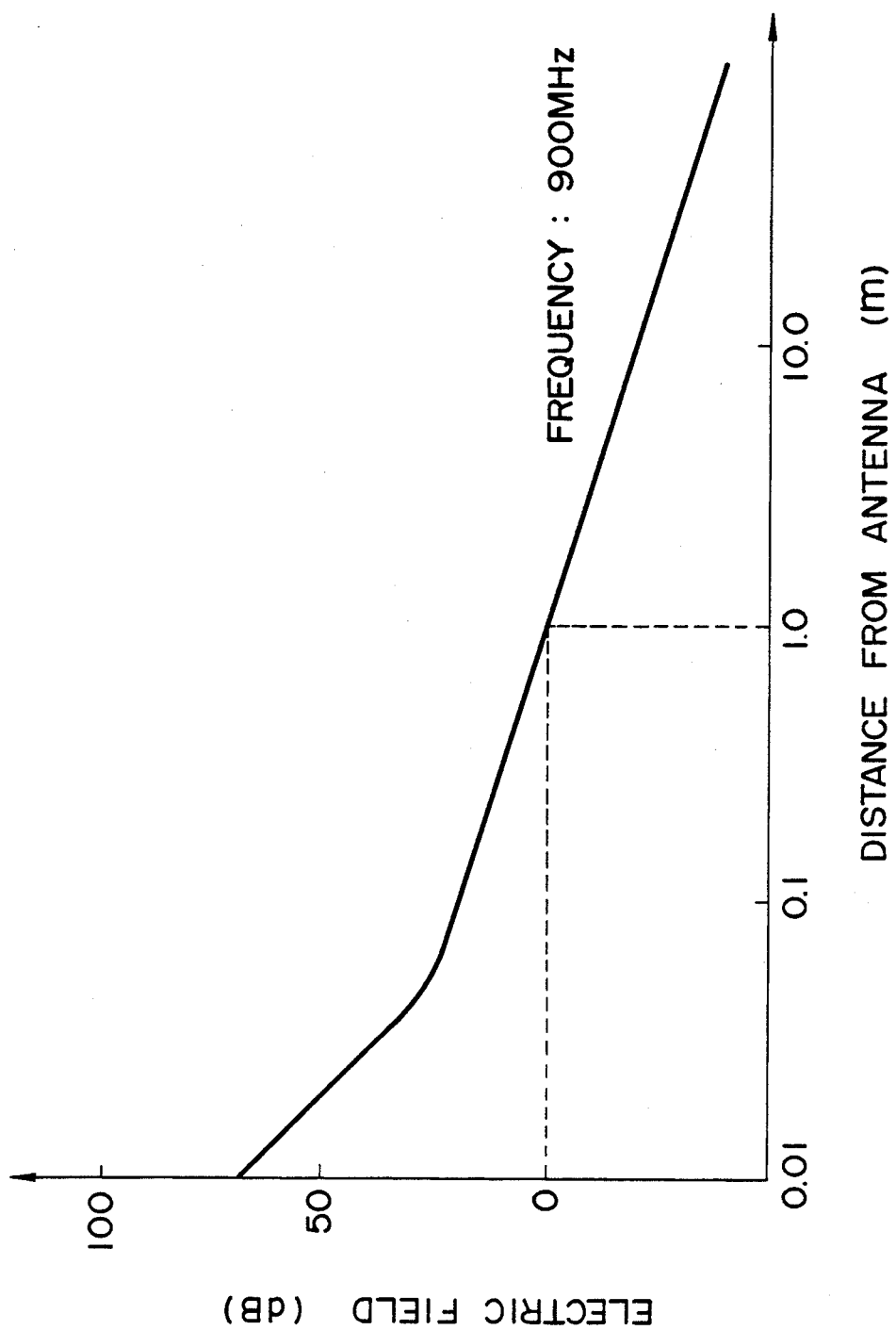
FIG. 8 is a graph illustrating the relationship between electric field strength and distance from an antenna.

FIG. 8 is a graph in which a change in electric field strength is plotted against the distance between a receiving antenna and a source of radio waves at a frequency of 900 MHz, which is a television broadcast frequency (channel 62, etc.) near the transmitting frequency of a mobile telephone. Normalization is carried out with a value at 1 m as 0 dB. If a mikcroelement O and a coordinate system shown in FIG. 7 are used, an electromagnetic field radiated in case of a current of I (A) is given by the following equations:

$$Er = \frac{\eta(I\iota)}{2\pi r^2}\left(1 + \frac{1}{jkr}\right)\cos\theta \cdot e^{-jkr}$$

$$E\theta = j\frac{\eta(I\iota)}{2\lambda r}\left(1 + \frac{1}{jkr} - \frac{1}{k^2 r^2}\right)\sin\theta \cdot e^{-jkr}$$

$$E\phi = 0, \quad Hr = 0, \quad H\theta = 0,$$

$$H\phi = j\frac{(I\iota)}{2\lambda r}\left(1 + \frac{1}{jkr}\right)\sin\theta \cdot e^{-jkr}$$

Here $Er = E\phi = 0$ holds in the x,y plane for $\theta = 90°$, so that the electric field strength is given by the following:

$$E\theta = j\frac{\eta(I\iota)}{2\lambda r}\left(1 + \frac{1}{jkr} - \frac{1}{k^2 r^2}\right)e^{-jkr}$$

Accordingly, if the antennas are spaced apart by tens of centimeters or more, a television antenna will be almost unaffected by a mobile telephone antenna when the telephone is used during reception of a television broadcast since the influence between elements diminishes in proportion to the square of the separation distance. This fact has been verified by experiment.

Therefore, even if an antenna for input of a radio wave signal and an antenna for both input and output of a radio wave signal are provided in the same sheet of windshield glass, disposing the two antennas the maximum distance apart will be effective in preventing radio wave interference. In order to install a mobile television antenna and mobile telephone antennas in the rear window glass of a vehicle in expectation of the abovementioned effect, the television antenna and the telephone antennas should be spaced apart by disposing the former at the upper edge of the window glass and the latter at the lower edge. By adopting such an arrangement, the central portion of the window glass is left largely free of antenna wires so as not to reduce rearward visibility while at the same time making it possible to install the heater wires. Thus, the various antenna wires in the rear window glass may coexist with one another in optimum fashion.

Though the foregoing description relates to an example in which the antennas are disposed on the rear window glass, the invention is not limited to such an arrangement, for the antennas can just as well be provided on the front windshield glass. FIG. 9 illustrates another embodiment of the invention, in which a mobile television antenna 202 and a mobile telephone antenna 203 are provided on the front windshield glass 102 of the vehicle shown in FIG. 5.

In this embodiment, the antennas are arrayed longitudinally in order to assure good forward visibility. As viewed from the driver's seat, the mobile television antenna 202 is located along the left edge of the windshield and the mobile telephone antenna 203 is situated at the upper right corner of the windshield so that visibility on both sides will not be impaired. An FM receiving antenna 206 is disposed at the center of the windshield. This antenna is also spaced sufficiently far away from mobile television antenna 202 and mobile telephone antenna 203 so that interference from these antennas will be minimized.

Thus, in accordance with this embodiment of the invention, the receiving antenna and the transceiving antenna can be provided in the same windshield glass without interfering with each other. For example, if the antennas are provided on the rear window glass, they can be disposed so as not to reduce rearward visibility. If the antennas are provided on the front window glass, they can be disposed so as not to interfere with forward visibility.

Though the receiving antenna is situated at the upper edge and the transceiving antenna at the lower edge of the window glass in the foregoing embodiment, it goes without saying that the positions of these two antennas can be interchanged.

Furthermore, costly pole antennas mounted by using special fittings are not required. This not only reduces mounting work and cost but also makes it unnecessary to purchase antennas separately, as when a mobile television and mobile telephone are installed as optional equipment after purchase of the automobile.

As described hereinabove, the receiving antenna and the transceiving antenna can be provided in the same windshield glass without interfering with each other. Moreover, these antennas can be installed so an not to impair the view of the driver.

Though the foregoing embodiments relate to an example where a mobile television antenna and a mobile telephone antenna coexist, it goes without saying that the invention can also be applied to the antennas for transceiver equipment involving radio waves for a personal wireless, data transmission, facsimile machine and the like.

In accordance with the present invention as described above, when a mobile telephone unit installed in an automobile is used (i.e. for making a call or responding to a call), a limitation is placed upon reception of a signal from a receiving antenna of another wireless receiver unit, such as a television receiver, that is near the transceiver antenna of the mobile telephone unit. As a result, reception is not impaired by the telephone unit, thus making it possible to maintain an ideal reception state.

As many apparently widely different embodiments of the present invention can be made without departing from the spirit and scope thereof, it is to be understood that the invention is not limited to the specific embodiments thereof except as defined in the appended claims.

What is claimed is:

1. An apparatus for a vehicle having a wireless transceiver unit and a separate wireless receiver unit, comprising:
    multiple receiving antennas for receiving electric waves for said wireless receiver unit, wherein one of the antennas of said multiple receiving antennas can be selectively connected to the wireless receiver in relationship to use of said transceiver unit;
    a transceiving antenna, located elsewhere from the multiple receiving antennas, for transmitting and receiving electric waves for said wireless transceiver unit;
    detecting means, operatively connected to said wireless transceiver unit, for detecting when the wireless transceiver unit is being used, and for providing an output signal in relationship thereto; and
    control means, operatively connected to said detecting means, for receiving the output signal from said detecting means when the detecting means detects that the transceiver unit is being used and for selecting an appropriate receiving antenna from said multiple receiving antennas for said wireless receiver unit in response to the output signal of said detecting means such that interference for the selected receiving antenna from the transceiving antenna is minimized.

2. The apparatus according to claim 1, wherein said multiple receiving antennas are provided at least at two multiple positions, said control means selects whichever receiving antenna of said multiple receiving antennas gives the best reception when said detecting means detects that said wireless transceiver unit is not being used, and excludes rom selection whichever receiving antenna of said multiple receiving antennas is nearest said transceiving antenna when said detecting means detects that said wireless transceiving unit is being used.

3. The apparatus according to claim 1, wherein said detecting means detects that said wireless transceiver unit is being used by detecting a change in electric field strength that accompanies use of said wireless transceiver unit.

4. The apparatus according to claim 1, wherein said wireless transceiver unit is a mobile radiotelephone.

5. The apparatus according to claim 4, wherein said detecting means detects that said mobile radiotelephone is being used by detecting that a handset of said radiotelephone has been taken off a hook.

6. The apparatus according to claim 1, wherein said wireless receiver unit is a unit for receiving broadcast electric waves.

7. The apparatus according to claim 6, wherein said wireless receiver unit is a television receiver for receiving broadcast electric waves.

8. An apparatus for a vehicle having a wireless transceiving unit for wireless communication and a separate wireless receiving unit, comprising:
    at least one transceiving antenna for transmitting and receiving electric waves for said wireless transceiver unit;
    one or more receiving antennas disposed in the vehicle for receiving electric waves for said wireless receiving unit;
    detecting means, operatively connected to said wireless transceiver unit, for detecting when said wireless transceiver unit is being used, and for providing an output signal in relationship thereto; and
    control means, operatively connected to said detecting means, for receiving the output signal from said detecting means when the detecting means detects that the transceiver unit is in use, and for turning the power off of the wireless receiver unit in response to the output signal of said detecting means such that interference for the transceiving antennas from the one or more receiving antennas is eliminated.

9. The apparatus according to claim 8, wherein multiple receiving antennas are provided at least at two different positions, said control means selects whichever receiving antennas of said multiple receiving antennas gives the best reception when said detecting means detects that said wireless transceiver unit is not being used, and excludes from selection whichever receiving antenna of said multiple receiving antennas is nearest said transceiving antenna when said detecting means detects that said wireless transceiving unit is being used.

10. The apparatus according to claim 8, wherein said detecting means detects that said wireless transceiver unit is being used by detecting a change in electric field strength that accompanies use of said wireless transceiver unit.

11. The apparatus according to claim 8, wherein said wireless transceiver unit is a mobile radiotelephone.

12. The apparatus according to claim 11, wherein said detecting means detects that said mobile radiotelephone is being used by detecting that a handset of said radio telephone has been taken off a hook.

13. The apparatus according to claim 8, wherein said wireless receiver unit is a unit for receiving broadcast electric waves.

14. The apparatus according to claim 13, wherein said wireless receiver unit is a television receiver for receiving broadcast electric waves.

* * * * *

UNITED STATES PATENT AND TRADEMARK OFFICE
CERTIFICATE OF CORRECTION

PATENT NO. : 5,056,153

DATED : OCTOBER 8, 1991

INVENTOR(S) : TATSUAKI TANIGUCHI ET AL.

It is certified that error appears in the above-identified patent and that said Letters Patent is hereby corrected as shown below:

Col. 10, line 11, "mikroelement" should be --microelement--.

Col. 12, line 28, "rom" should be --from--.

Signed and Sealed this

Ninth Day of March, 1993

Attest:

STEPHEN G. KUNIN

Attesting Officer

Acting Commissioner of Patents and Trademarks